(12) United States Patent
Sellers et al.

(10) Patent No.: US 7,490,858 B1
(45) Date of Patent: Feb. 17, 2009

(54) SPORTS EQUIPMENT TRANSPORT APPARATUS

(75) Inventors: David R. Sellers, 3301 County Rd. 96, Ward, CO (US) 80481; Deanna L. Griffith, Topanga, CA (US); Etienne Iliffe-Moon, Los Angeles, CA (US); Daniel W. Ashcraft, Torrance, CA (US)

(73) Assignee: David R. Sellers, Ward, CO (US)

( * ) Notice: Subject to any disclaimer, the term of this patent is extended or adjusted under 35 U.S.C. 154(b) by 332 days.

(21) Appl. No.: 11/252,060

(22) Filed: Oct. 17, 2005

(51) Int. Cl.
*B62B 1/22* (2006.01)

(52) U.S. Cl. .................................... 280/814; 280/47.26

(58) Field of Classification Search ................ 280/809, 280/814, 47.131, 47.17, 47.24, 47.26, 652; 224/917, 917.5; 16/35 R, 47
See application file for complete search history.

(56) References Cited

U.S. PATENT DOCUMENTS

| | | | |
|---|---|---|---|
| 2,042,086 A * | 5/1936 | Hermenegilde | ............. 280/814 |
| 3,779,568 A * | 12/1973 | Wakabayashi | ................. 280/9 |
| 4,114,915 A | 9/1978 | Lello et al. | |
| 4,268,050 A | 5/1981 | Kennedy, Sr. | |
| 4,310,190 A * | 1/1982 | Schuetzeberg et al. | ...... 294/147 |
| 4,358,137 A | 11/1982 | Gramm | |
| 4,540,198 A * | 9/1985 | Kyburz | ........................ 280/814 |
| 4,666,184 A * | 5/1987 | Garvey, Jr. | .................. 280/814 |
| 4,848,782 A * | 7/1989 | Schmidt | ................ 280/47.131 |
| 4,856,811 A | 8/1989 | Bressler et al. | |
| 4,889,364 A * | 12/1989 | Glaunes | ....................... 280/814 |
| 5,106,112 A | 4/1992 | Sargent | |
| 5,240,285 A | 8/1993 | Harris | |
| 5,277,449 A | 1/1994 | Schmidt | |
| 5,282,535 A * | 2/1994 | Rowland | ................. 206/315.1 |
| 5,340,153 A * | 8/1994 | Parker | ......................... 280/814 |
| 5,639,122 A * | 6/1997 | Churchill | .................... 280/814 |
| 6,070,906 A | 6/2000 | Allen | |
| 6,086,102 A | 7/2000 | Stark et al. | |
| 6,360,851 B1 * | 3/2002 | Yang | ......................... 188/1.12 |
| 6,848,718 B2 | 2/2005 | Ravikumar et al. | |

\* cited by examiner

*Primary Examiner*—Frank B Vanaman
(74) *Attorney, Agent, or Firm*—Daniel P. Dooley; Fellers, Snider et al.

(57) ABSTRACT

A combination, which preferably includes at least a wheel supporting a transport caddy, an alpine snow ski removably disposed within said transport caddy and detachably secured to said transport caddy by a spring loaded mechanical latch, and an accessories support member detachably attached to said alpine snow ski and detachably securing a ski pole adjacent said alpine snow ski is disclosed. Preferably, the ski pole is secured to the transport caddy by steps that include at least: positioning a ski pole tip within the transport caddy; rotating a ski pole confinement member into non-adjacency with a ski pole retention portion of the accessories support member, sliding a shaft portion of the ski pole past a pole retention spring clip and into contact with the pole confinement member, and re-rotating the ski pole confinement member into pressing contact with the shaft thereby securing the shaft within the pole confinement member.

18 Claims, 15 Drawing Sheets

US 7,490,858 B1

SPORTS EQUIPMENT TRANSPORT APPARATUS

FIELD OF THE INVENTION

The claimed invention relates to the field of sports equipment transport apparatuses; more particularly, but not by way of limitation, to an apparatus for transporting snow ski equipment.

BACKGROUND

Transporting snow skis, poles, helmet, and goggles from a ski bus, train, or automobile to a ski lodge can be awkward, cumbersome, and potentially hazardous to the skier and to others that may happen to come in close proximity to the skier. Attempts in the prior art to address the problem include: an elastic ski covering having removable fasteners, which fails to provide a convenient compartment for safe storage of ski poles during transport; ski and pole cases that are large, bulky, and difficult to control; and attachable wheels, that require alterations to the skis to become functional.

Accordingly, there is a continuing need for improved devices and procedures for the transport of snow ski equipment.

SUMMARY OF THE INVENTION

In accordance with preferred embodiments, an apparatus is preferably provided with at least a wheel supporting a transport caddy, a spring loaded mechanical latch secured to the transport caddy, and an accessories support member disposed within the transport caddy and detachably secured to the transport caddy by the spring loaded mechanical latch.

Preferably, the transport caddy includes at least a primary confinement compartment supported by the wheel and within which the accessories support member is disposed. The transport caddy preferably further includes a secondary confinement compartment adjacent the primary confinement compartment, wherein the secondary confinement compartment is configured to accommodate said spring loaded mechanical latch.

In a preferred embodiment, a pair of alpine snow skis are positioned within the primary confinement compartment and the spring loaded mechanical latch is activated to secure the skis within the primary confinement compartment, the accessories support member is positioned adjacent a ski boot binding of one of the pair of skis, and detachably attached to the ski boot binding. With the accessories support member detachably attached to the ski binding, a tip of a ski pole is deposited within a secondary confinement compartment of said transport caddy, a ski pole confinement member of the accessories support member is rotated into non-adjacency with a ski pole retention portion of the accessories support member to provide access by the ski pole to the ski pole retention portion.

With the ski pole retention portion made accessible to the ski pole, a shaft portion of the ski pole is slid past a pole retention spring clip of the accessories support member and into contact with said pole confinement member, and upon re-rotation of the ski pole confinement member, the shaft of the ski pole is placed into pressing contact with the ski pole confinement member.

These and various other features and advantages which characterize the claimed invention will be apparent from reading the following detailed description and a review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated and lie within the scope and spirit of the invention.

Figure 1:
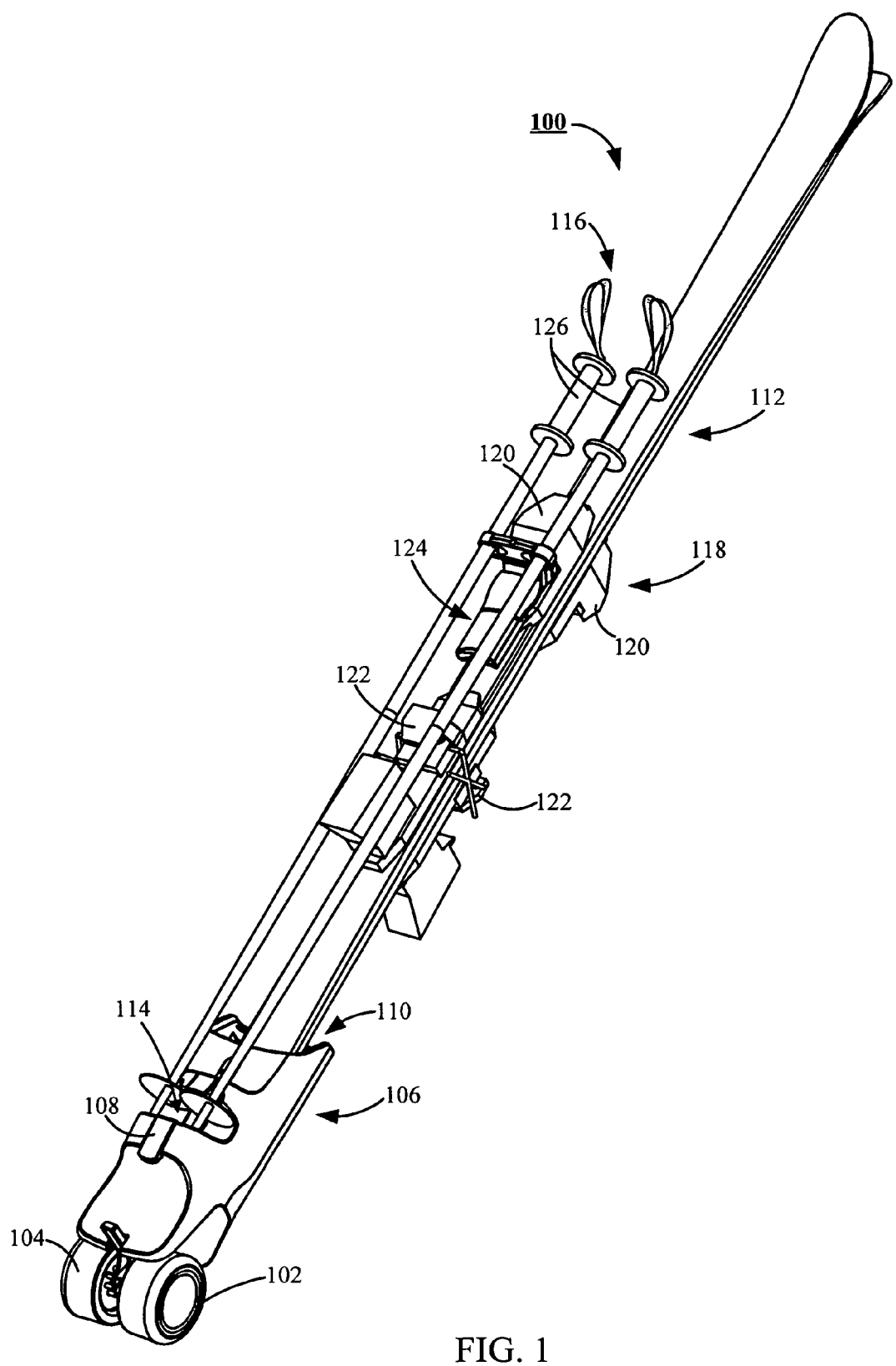
FIG. 1 is a perspective view of the novel sports equipment transport apparatus with snow ski equipment secured thereon.

Referring to the drawings, FIG. 1 shows a novel sports equipment transport apparatus ("transport") 100. The transport 100 has been found useful for manually transporting sports equipment, in particular for use in transporting snow ski equipment. The transport 100 maintains the ski equipment in an organized and transportable configuration, which allows the skier to easily transport the equipment from a car to, for example, a ski lodge, airline terminal, hotel, or home. To facilitate the organization and transport of the ski equipment, the transport 100 preferably provides at least one wheel 102, and more preferably a second wheel 104. The wheels 102 and 104 support a transport caddy 106, which in turn supports a spring loaded mechanical latch 108 secured to the transport caddy.

In a preferred embodiment, the transport caddy provides a primary confinement compartment 110 configured to accept a pair of alpine snow skis ("skis") 112, and a secondary confinement compartment 114 configured to accept a pair of ski poles 116. Each ski of the pair of skis 112 includes a ski boot binding 118 (also referred to herein as binding 118), which includes at least a toe confinement portion 120 and a brake portion 122. In a preferred embodiment, the pair of skis 112 are positioned within the primary confinement compartment 110 such that the binding 118 of a first ski of the pair of skis 112 faces ground-wardly, while the binding 118 of a second ski of the pair of skis 112 faces sky-wardly.

In the preferred embodiment, the transport 100 further includes an accessories support member 124 supported by the sky-wardly facing binding 118. Securing the accessories support member 124 to the sky-wardly facing binding 118 provides a number of advantages to users of the transport 100. Those advantages result from the relationship between a length of the skis 112 and the height of the skier utilizing skis 112 of a particular length. Preferably, as the height of a skier increases, the length of the skis utilized by that skier increases, however the positional relationship of ski boot binding 118, relative to the tip of the ski supporting the ski boot binding 118, remains substantially constant. In addition to the substantially constant relationship between the positions of the binding relative to the ski tips, the ratio between the overall length of the skis 112 and the overall length of its accompanying pair of ski poles 116 also remains substantially constant.

By selecting the sky-wardly facing binding 118 as the mounting position for the accessories support member 124, and securing the pair of ski poles 116 to the accessories support member 124, the handle portions 126 of the pair of ski poles 116 are present to the skier at a natural and convenient height for use in towing the skis (provided the skis being towed are sized to the person towing the skis). It is also noted that by presenting both handle portions 126 to the skier at substantially a common height, but offset from one another, the handle portions are positioned for convenient use by the skier using either their right or left hand.

An additional advantage of preferably selecting the sky-wardly facing binding 118 as the mounting position for the accessories support member 124, is that the load of the transport 100, with the skis 112 and the pair of ski poles 116 secured thereto is substantially distributed for enhanced mobility. By preferentially depositing the pair of skis 112 within the primary confinement compartment 110 such that the bindings 118 and the pair of skis 112 respectively face ground-wardly and sky-wardly, the amount of flex engineered into each ski of the pair of skis provides a primary spring suspension between the wheels 102 and 104 and the handle portion 126. By mounting the pair of ski poles 116 above the ski boot binding 118, and parallel to the pair of skis 112, a secondary spring suspension is provided between the wheels 102 and 104. The result of the primary and secondary suspensions working in concert mitigates and dampens mechanical shocks encountered by the wheels 102 and 104 traversing uneven and disruptive surfaces.

Figure 2:
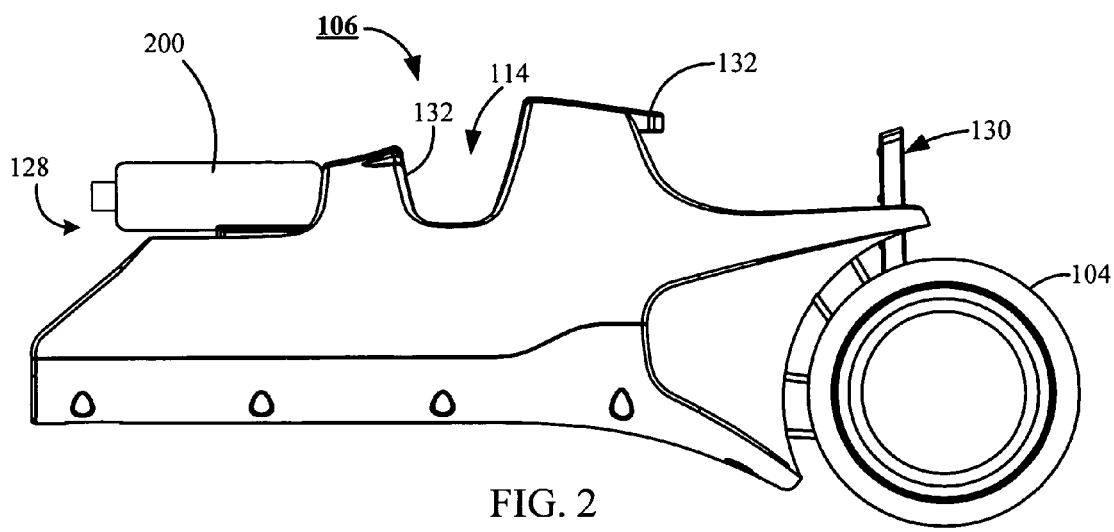
FIG. 2 is a side elevational view of the novel sports equipment transport apparatus of FIG. 1.
Figure 3:
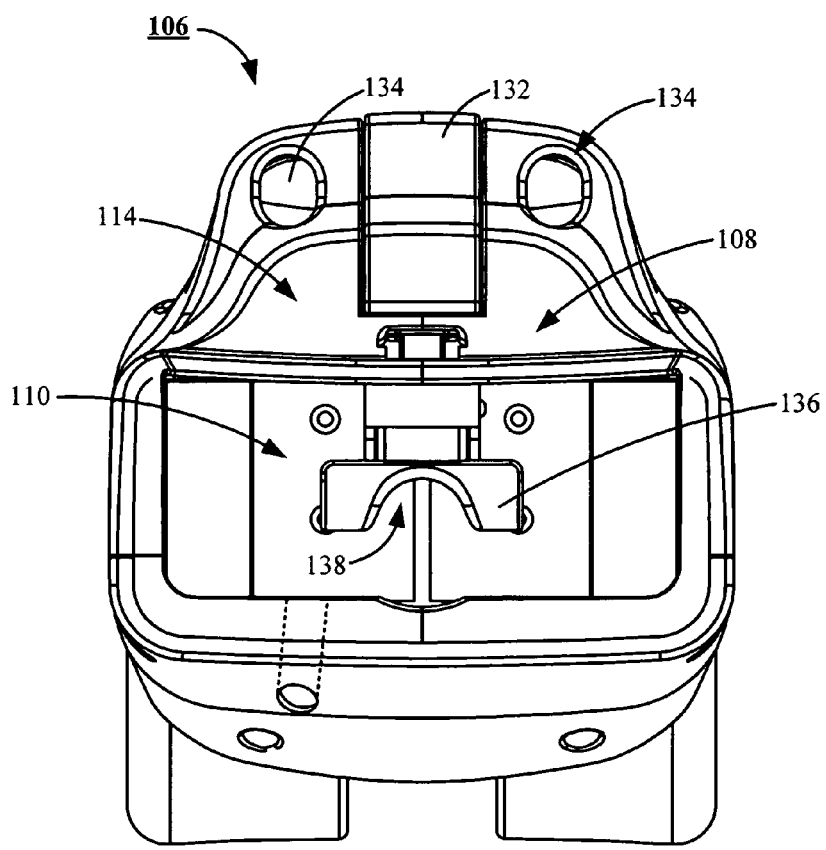
FIG. 3 is a top plan view of the novel sports equipment transport apparatus of FIG. 1.

FIG. 2 shows the transport caddy 106 preferably further includes a cable lock support member 128, a brake assembly 130 disposed adjacent the wheel 104, and that a mechanical lever 132, which conforms to an interior contour 145 (of FIG. 4) of the secondary confinement compartment 114. While FIG. 3 shows the transport caddy 106 provides a pair of ski pole tip apertures 134 and a plunger 136 of the spring loaded mechanical latch 108. The plunger 136 provides a relief 138, which is configured to accommodate securement of the accessories support member 124 (of FIG. 1) within the primary confinement compartment 110, when the primary confinement compartment is not in use for transporting the skis 112 (of FIG. 1). The ski pole tip apertures 134 provide access by a tip 140 (of FIG. 4) of each ski pole of the pair of ski poles 116 (of FIG. 4). In a preferred embodiment, the transport caddy 106 is preferably formed from a polymer such as ABS, and the plunger is formed from a polymer such as Delron®, or Nylon®.

Figure 4:
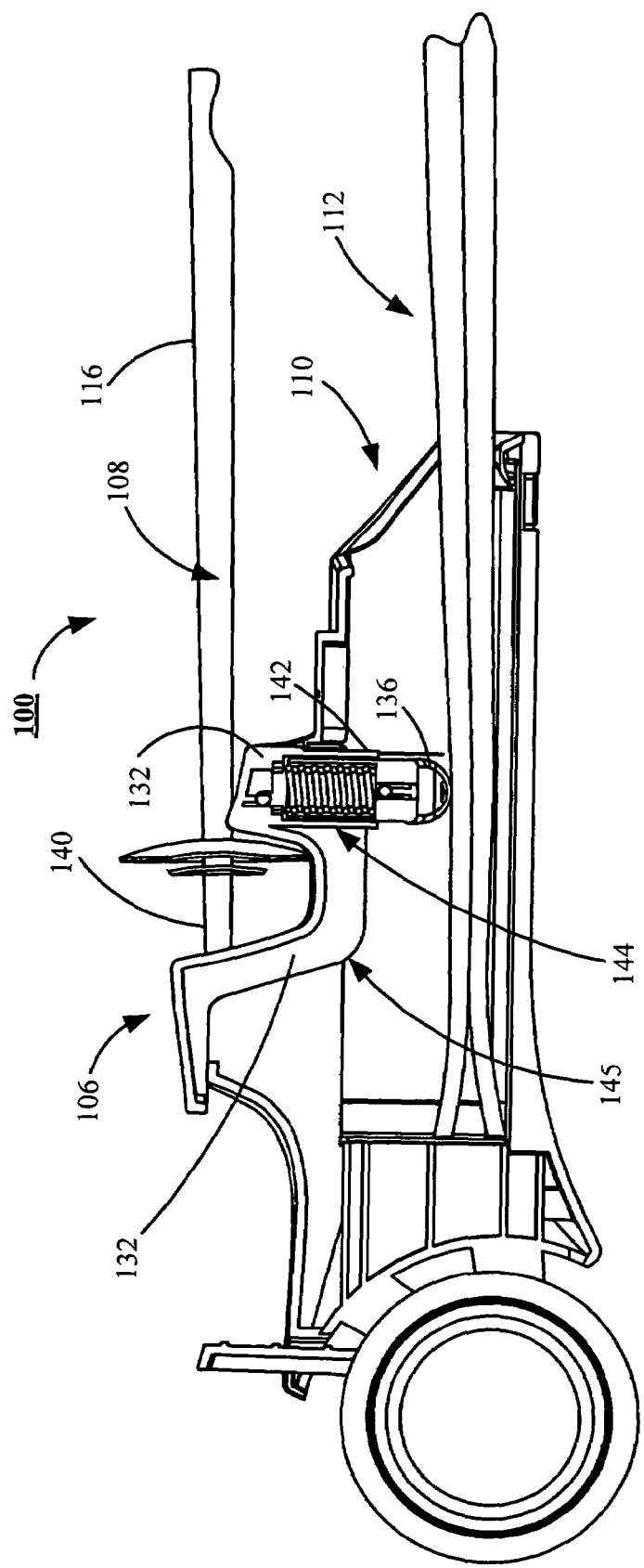
FIG. 4 is a partial cutaway, side elevational view of the novel sports equipment transport apparatus of FIG. 1.
Figure 11:
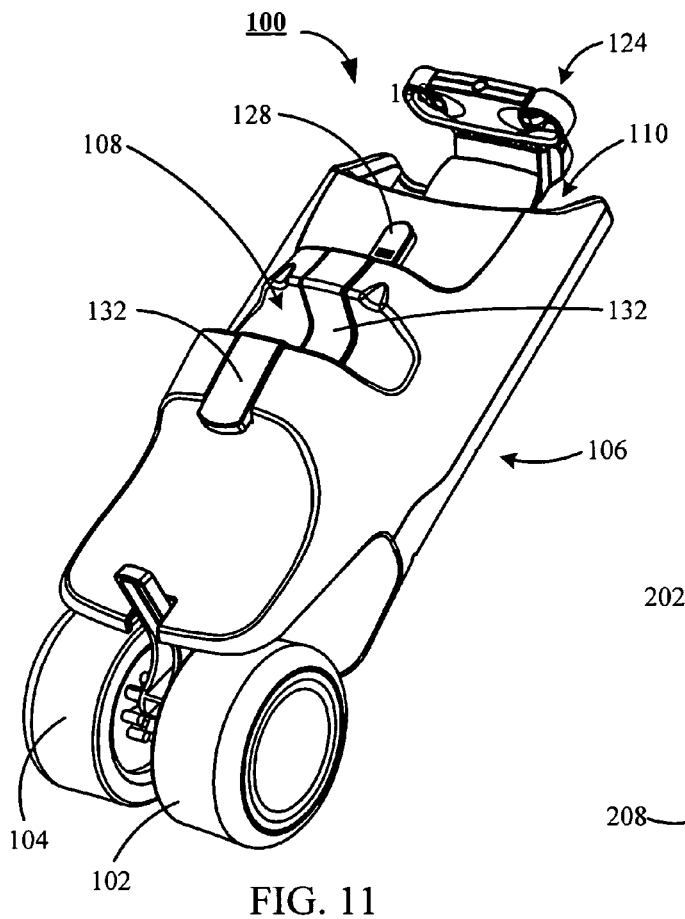
FIG. 11 is a perspective view of the novel sports equipment transport apparatus of FIG. 1 configured for storage.

Continuing with FIG. 4, the cross-sectional view of the transport caddy 106 shows the spring loaded mechanical latch 108 preferably includes a shaft 142 provided by the mechanical lever 132, the plunger 136 secured to said shaft 142, a compressive spring ("spring") 144 communicating with the plunger 136, and the mechanical lever 132 in pressing contact with the interior contour 145 of the secondary confinement compartment 114. The mechanical lever 132 communicates with and acts on the spring 144 when the mechanical lever 132 is in a closed position. The spring 144 develops a compressive force in response to the mechanical lever 132 being placed in the closed position, as shown by FIG. 4. The spring 144 transfers said compressive force to the plunger 136 to secure the skis 112 within the primary confinement compartment 110, or to secure the accessories support member 124 within the primary confinement compartment 110 (as shown by FIG. 11), when the transport caddy is not being used to transport skis 112.

Figure 5:
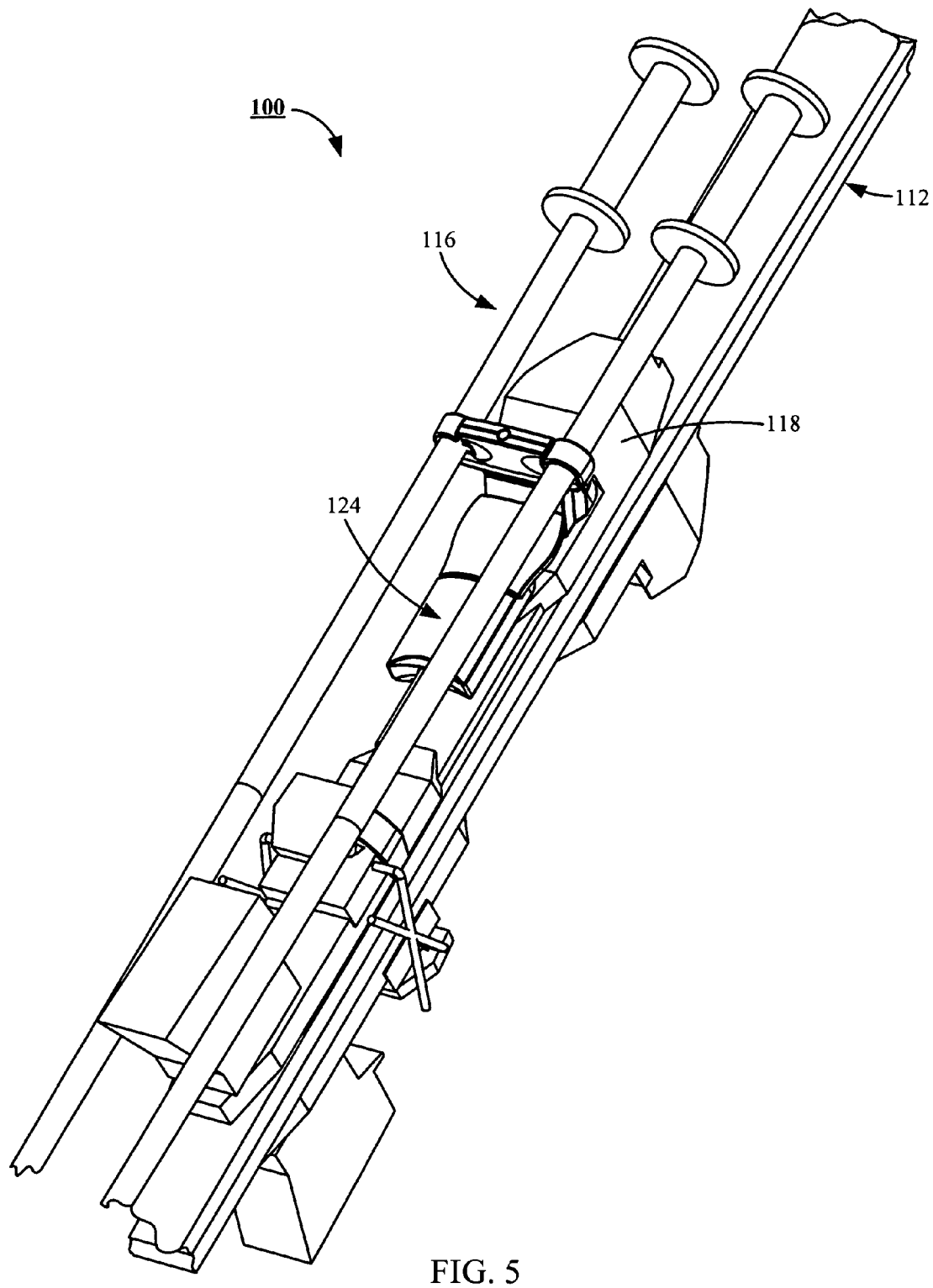
FIG. 5 is a partial cutaway, perspective view of the novel sports equipment transport apparatus of FIG. 1.
Figure 6:
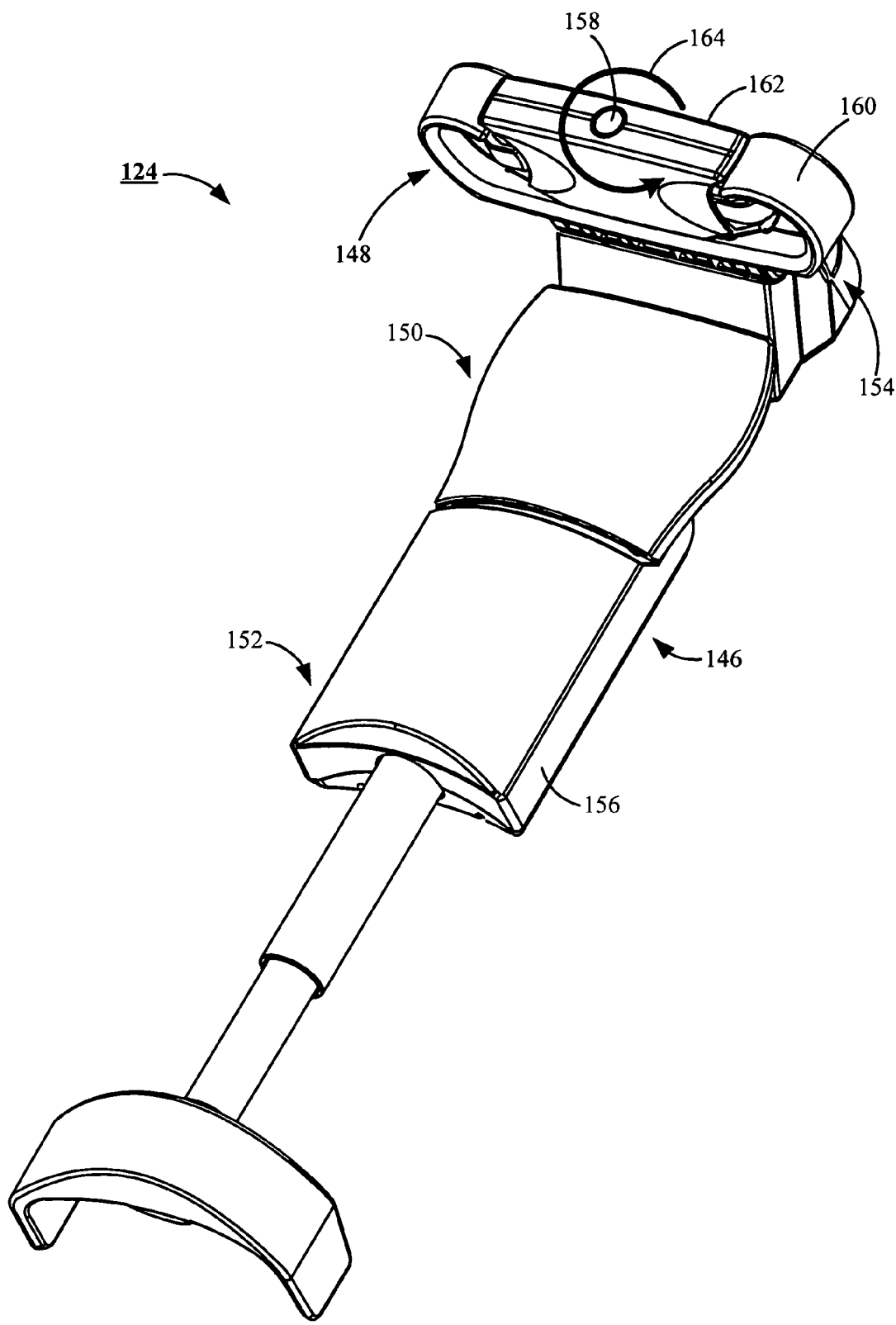
FIG. 6 is a perspective view of an accessories support member of the novel sports equipment transport apparatus of FIG. 1.

To gain an enhanced understanding of the accessories support member 124 shown by FIGS. 5 through 8, those figures should preferably be viewed in concert. FIG. 5 provides an improved perspective of the relationship between the skis 112, the ski poles 116, the binding 118, and the accessories support member 124, while FIG. 6 illustrates a first attachment member 146 supporting an accessories confinement assembly 148 (also referred to herein as a ski pole confinement assembly 148), a lockdown assembly 150 adjacent the accessories confinement assembly 148, and a sizing assembly 152 adjacent the lockdown assembly 150. The first attachment member 146 preferably includes a front confinement portion 154, which cooperates with the toe confinement portion 120 of the binding 118 (of FIG. 1), and a main body portion 156 to which the lockdown assembly 150 and the sizing assembly 152 are attached to.

Figure 7:
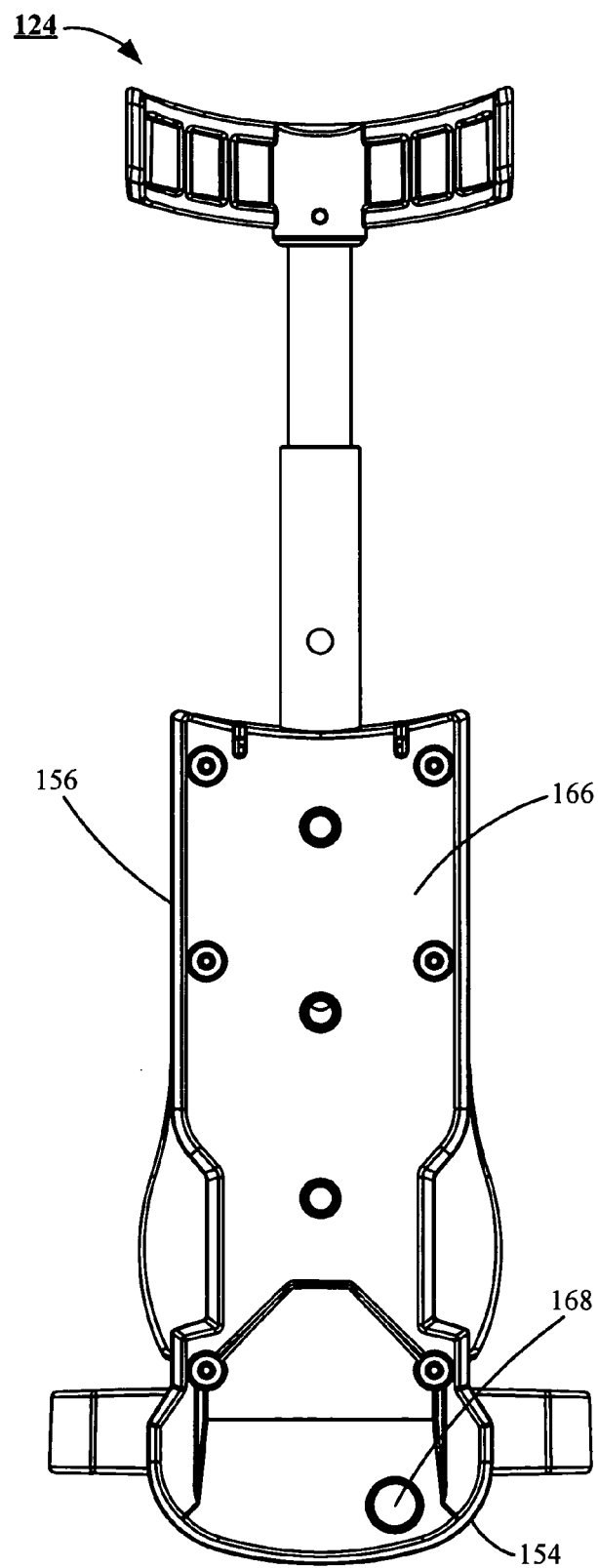
FIG. 7 is a bottom plan view of the accessories support member of FIG. 6.

The accessories confinement assembly 148 preferably includes at least a central support shaft 158 fixedly secured to the main body portion 156, an accessories retention portion 160 (also referred to herein as a ski pole retention portion 160) adjacent the central support shaft 158 and attached to main body portion 156, and an accessories confinement member 162 (also referred to herein as a ski pole confinement member 162) adjacent the accessories retention portion 160 and retained by the central support shaft 158 for rotation about the central support shaft 158, as shown by the rotational vector 164. FIG. 7 shows the first attachment member 146 further includes a base 166 upon which the main body portion 156 and a front confinement portion 154 are secured, and a cable lock access aperture 168 for use in securing the transport 100 (of FIG. 1) to a stationary object when the transport 100 is not in use for towing ski equipment.

Figure 8:
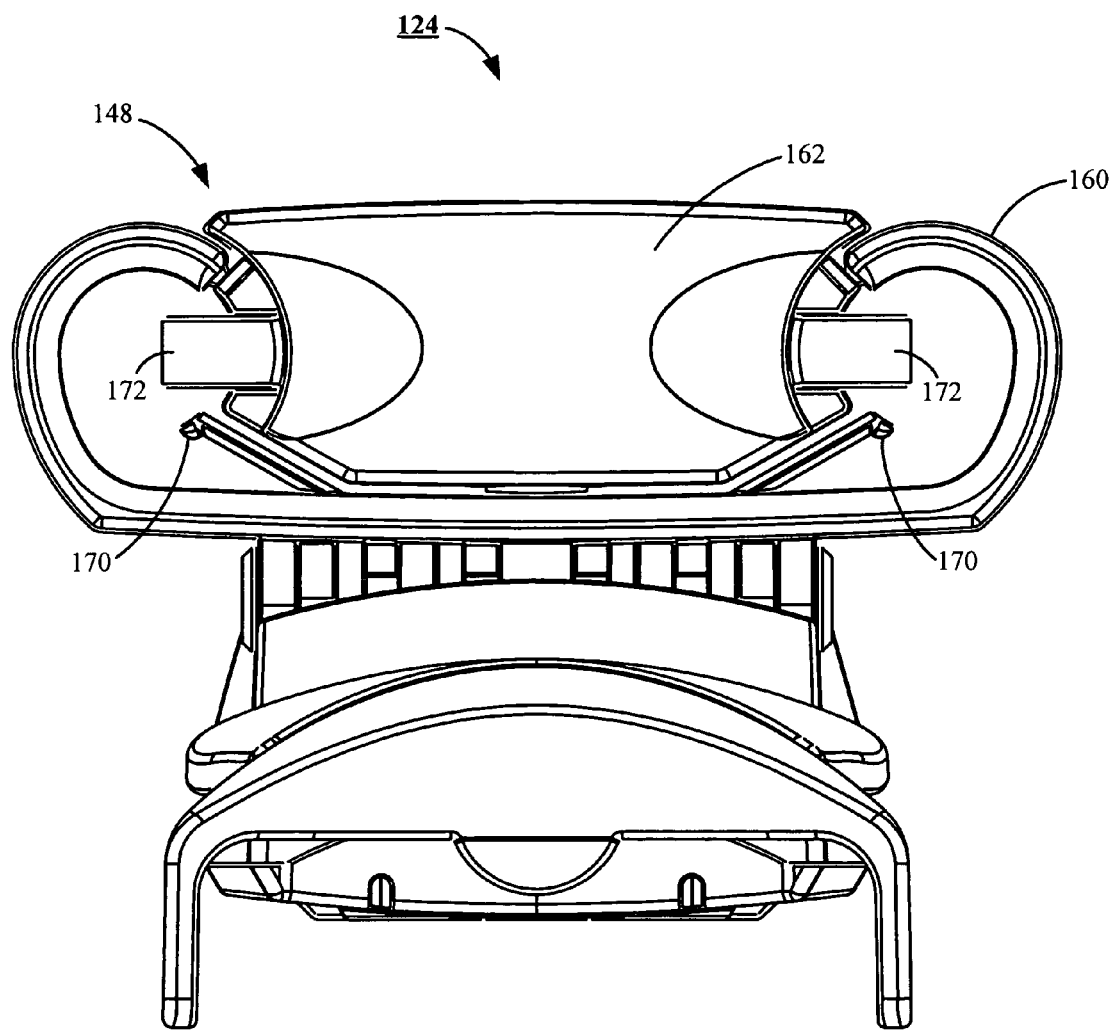
FIG. 8 is an end elevational view of the accessories support member of FIG. 6.

FIG. 8 shows the accessories confinement assembly 148 further preferably includes a pair of pole retention spring clips 170, which are used to promote the securement of the ski poles 116 (of FIG. 5) within the accessories retention portion 160, and a pair of pole confinement bumpers 172, which maintain the ski poles 116 pressingly engaged against the interior wall of the accessories retention portion 160. In a preferred embodiment the pole confinement bumpers 172 are produced from a flexible polymer that conforms to the shape of the ski poles 116 when securing the poles against the interior wall of the accessories retention portion 160, and return to their original form when the pole confinement bumpers 172 are disengaged from securement of the poles.

Figure 9:
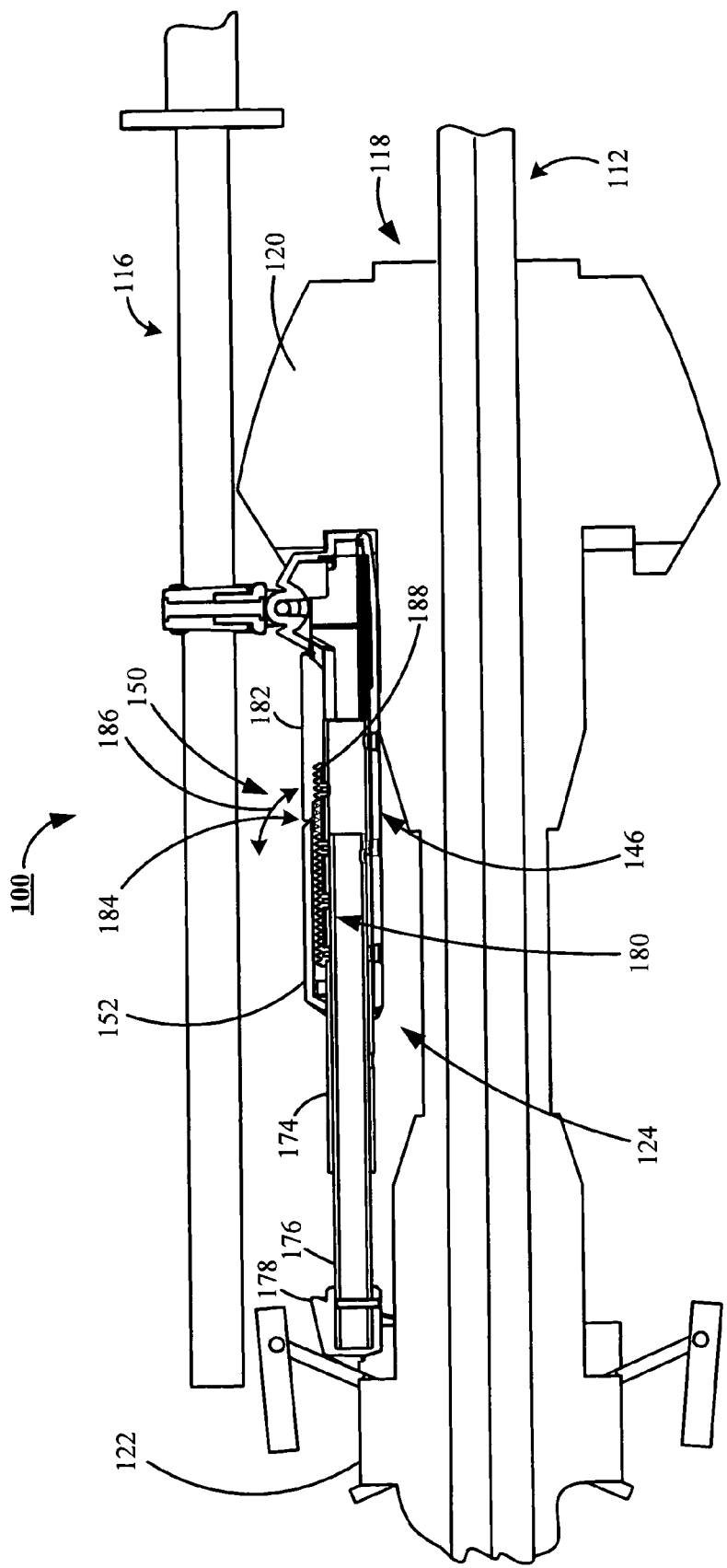
FIG. 9 is a partial cutaway, side elevational view of the novel sports equipment transport apparatus of FIG. 1.

FIG. 9 primarily shows a cross-sectional view of the interaction between the lockdown assembly 150 and the sizing assembly 152. The sizing assembly 152 preferably includes a positioning member 174 in sliding contact with the first attachment member 146, and an extension member 176 in sliding contact with the positioning member 174, which supports a second attachment member 178. The positioning member 174 further provides a retention portion 180, which in a preferred embodiment takes on the configuration of a rack portion of a rack and pinon gear.

The lockdown assembly 150 preferably includes a cover portion 182 that communicates with a hinge member 184, which rotates relative to the positioning member 174 as shown by the rotational vector 186. The cover portion 182 provides a retention feature 188 that is configured to interact with the retention portion 180 of the sizing assembly 152. When mounting the accessories support member 124 to the binding 118, the retention feature 188 of the cover portion 182 is disengaged from the retention portion 180 of the positioning member 174, by placing the cover portion 182 in an open position. With the cover portion 182 in an open position the accessories support member 124 is positioned to snugly fit within the binding 118, and once in position, the cover portion 182 is placed in a closed position such that the retention feature 188 interacts with the retention portion 180 of the positioning member 174 to securely lock the access support member 124 within the binding 118.

Figure 10:
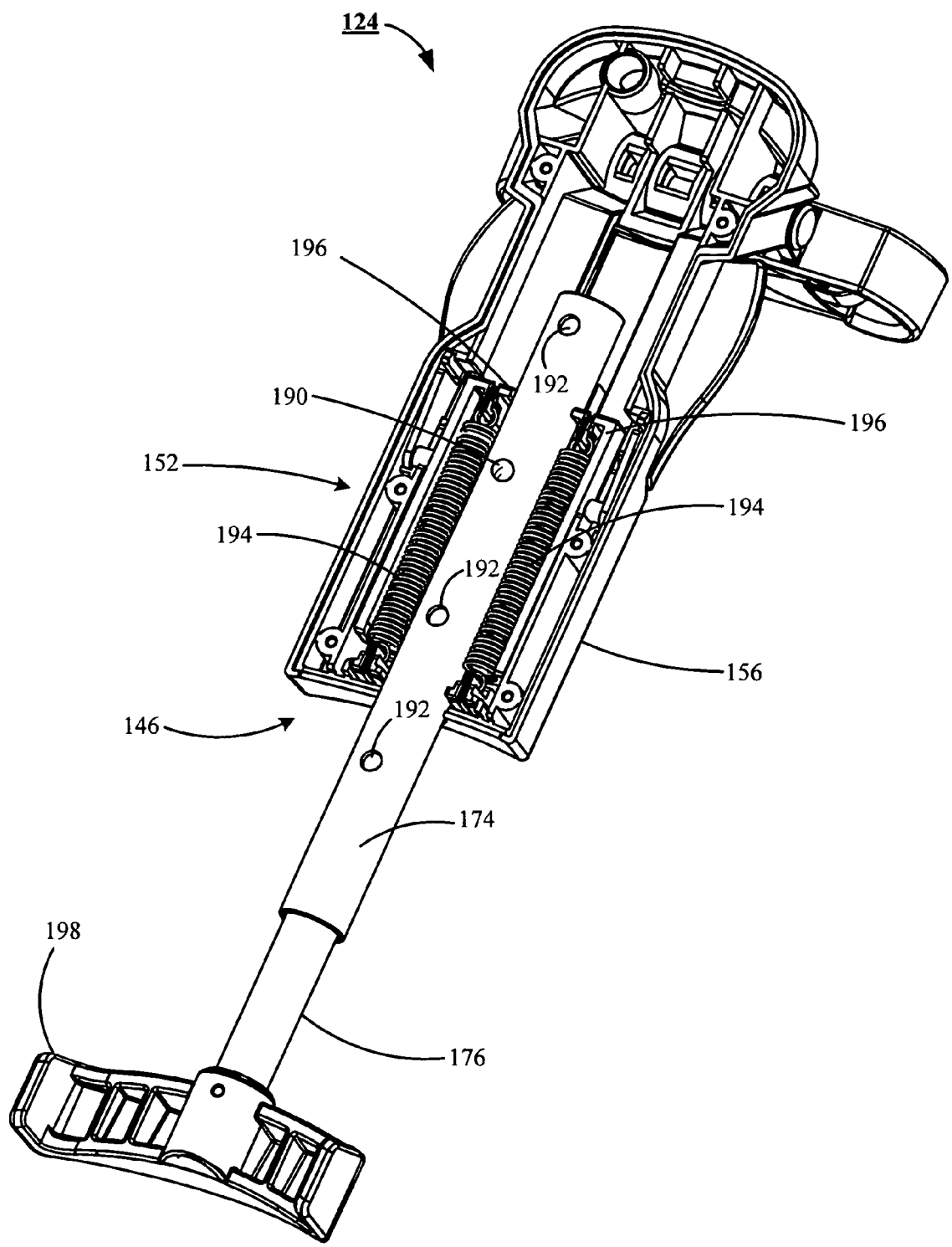
FIG. 10 is a bottom perspective view of the accessories support member of FIG. 6, with a base plate removed for ease of viewing.

FIG. 10 provides a preferred viewing of the sizing assembly 152, which includes the positioning member 174 that is preferably configured to slide within the main body portion 156 of the first attachment member 146. In a preferred embodiment the sizing assembly 152 includes the extension member 176 that slides within the positioning member 174. It will be noted that the extension member 176 provides a spring-loaded retention button 190 that interacts with the sizing apertures 192 provided by the positioning member 174.

By positioning the retention button 190 within a selected one of the sizing apertures 192, a gross sizing of the accessories support member 124 relative to a particular sizing of the binding 118 (of FIG. 5) is attained. To ensure proper sizing of the accessories support member 124 relative to a particular sizing of the binding 118, preferably a pair of tension springs 194 interact between the main body portion 156 and a pair of spring tabs 196 to adjust the overall size of the accessories support member 124 to precisely fit a particular sizing of the binding 118. To accommodate stability of the accessories support member 124 relative to the binding 118, the extension member 176 further provides a second attachment member 198. The second attachment member 198 preferably interacts with the brake portion 122 of the binding 118 (a FIG. 5).

Figure 12:
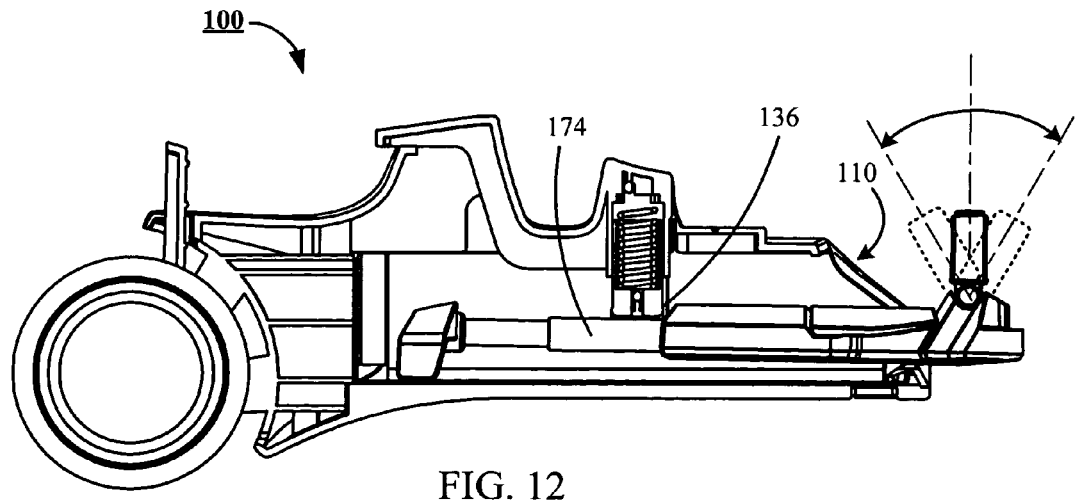
FIG. 12 is a partial cutaway, side elevational view of the novel sports equipment transport apparatus of FIG. 11.

FIGS. 11 and 12 each show the transport 100 configured for storage. As shown by FIG. 11, in a storage configuration the wheels 102 and 104 preferably continues to support the transport caddy 106, however rather than the skis 112 (of FIG. 1) being confined within the primary confinement compartment 110, the accessories support member 124 is preferably confined within the primary confinement compartment 110, and retained in position by the mechanical lever 132 (of the spring loaded mechanical latch 108) interacting with the transport caddy 106. FIG. 12 shows the interaction between the plunger 136 and the positioning member 174 that results in the confinement of the accessories support member 124 within the primary confinement compartment 110.

Figure 13:
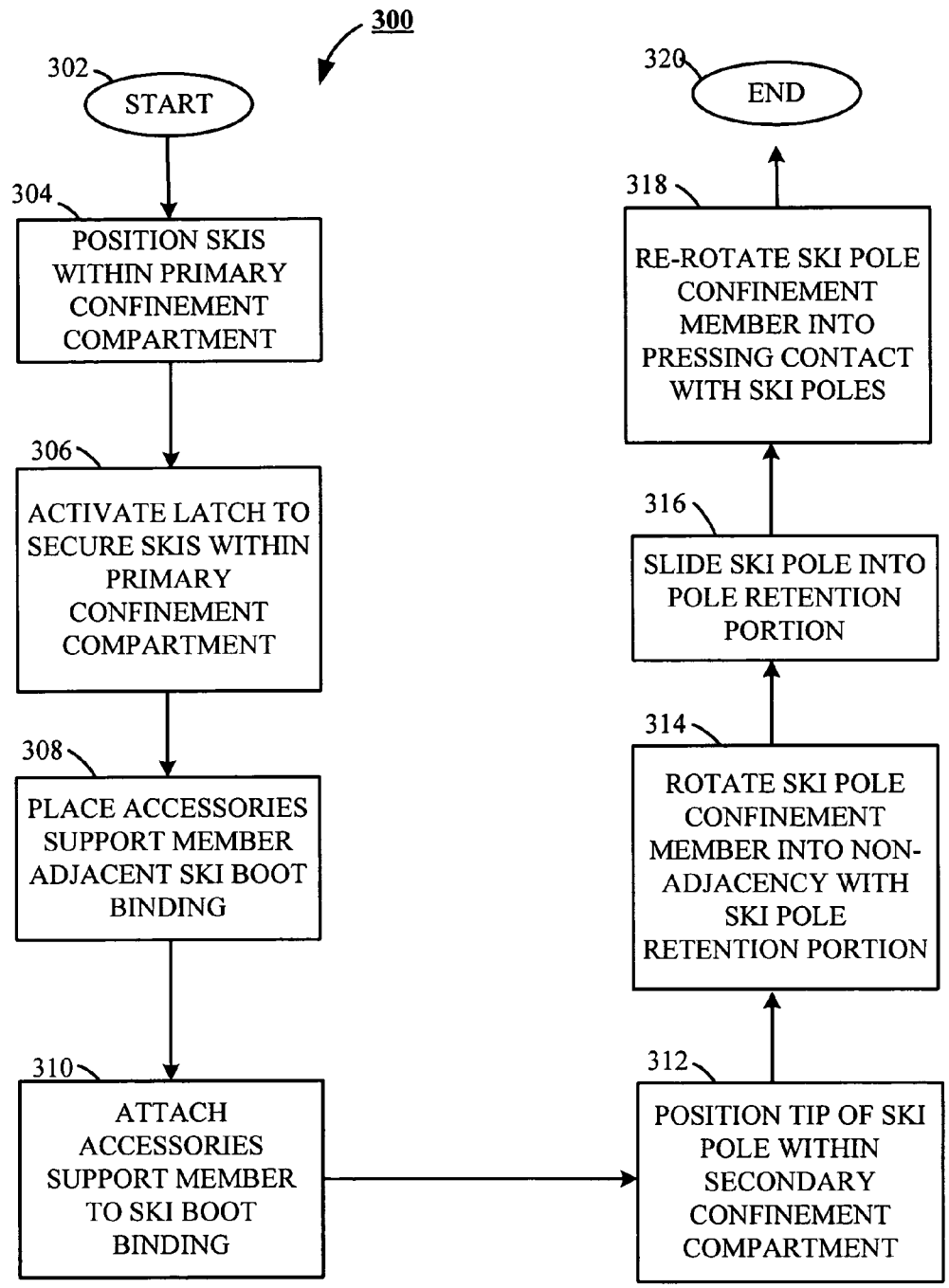
FIG. 13 is a flowchart of a method of using the novel sports equipment transport apparatus of FIG. 1.

FIG. 13 shows a method 300 of using an inventive sports equipment transport apparatus (such as 100) commencing at start step 302 and continuing at process step 304. At process step 304, a pair of skis (such as 112) are positioned within a primary confinement compartment (such as 110), and at process step 306, a spring loaded mechanical latch (such as 108) is activated to secure the skis within the confinement compartment.

At process step 308, an accessories support member (such as 124) is placed adjacent a ski boot binding (such as 118). At process step 310, the accessories support member is attached to the ski boot binding. At process step 312, each tip (such as 140) of a pair of ski poles (such as 116) are advanced through corresponding ski pole tip apertures (such as 134) to each position each tip of each ski pole within a secondary confinement compartment (such as 114). With the tips of the ski poles positioned within the secondary confinement compartment, a ski pole confinement member (such as 162) is rotated into non-adjacency with a ski pole retention portion (such as 160) at process step 314.

At process step 316, each shaft (such as 158) of each ski pole is slid into their respective positions within the ski pole retention portion. At process step 318, the ski pole confinement member is re-rotated into pressing contact with the respective shaft portions of each ski pole, and the process concludes at end process step 320.

Figure 14:
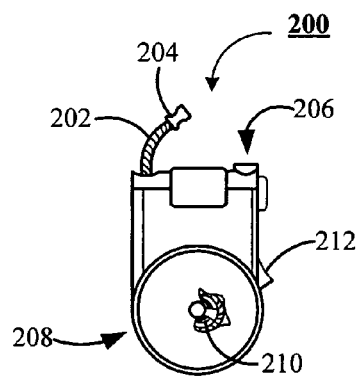
FIG. 14 is a plan view of a cable lock for use in securing an un-attended novel sports equipment transport apparatus of FIG. 1 to a stationary structure.

FIG. 14 shows a cable lock 200 that has been found useful for security purposes, when the transport 100 is configured for storage, as shown by FIG. 11. When in use, the cable lock 200 mitigates against theft of the transport 100, particularly when left unattended by the skier. When the cable lock 200 is not in use, the transport caddy 106 (of FIG. 11) provides the cable lock support member 128, which accommodates placement of the cable lock 200 on the transport caddy 106 as shown by FIG. 2.

The cable lock 200 provides a retention cable 202 that includes a lock interface 204, a lock receptacle 206, a spring activated recoil assembly 208 that features a recoil spring 210, and a recoil button 212, which when activated causes the recoil assembly 208 to retrieve the retention cable 202 from an uncoiled presentation to a recoiled presentation within the spring activated recoil assembly 208.

Figure 15:
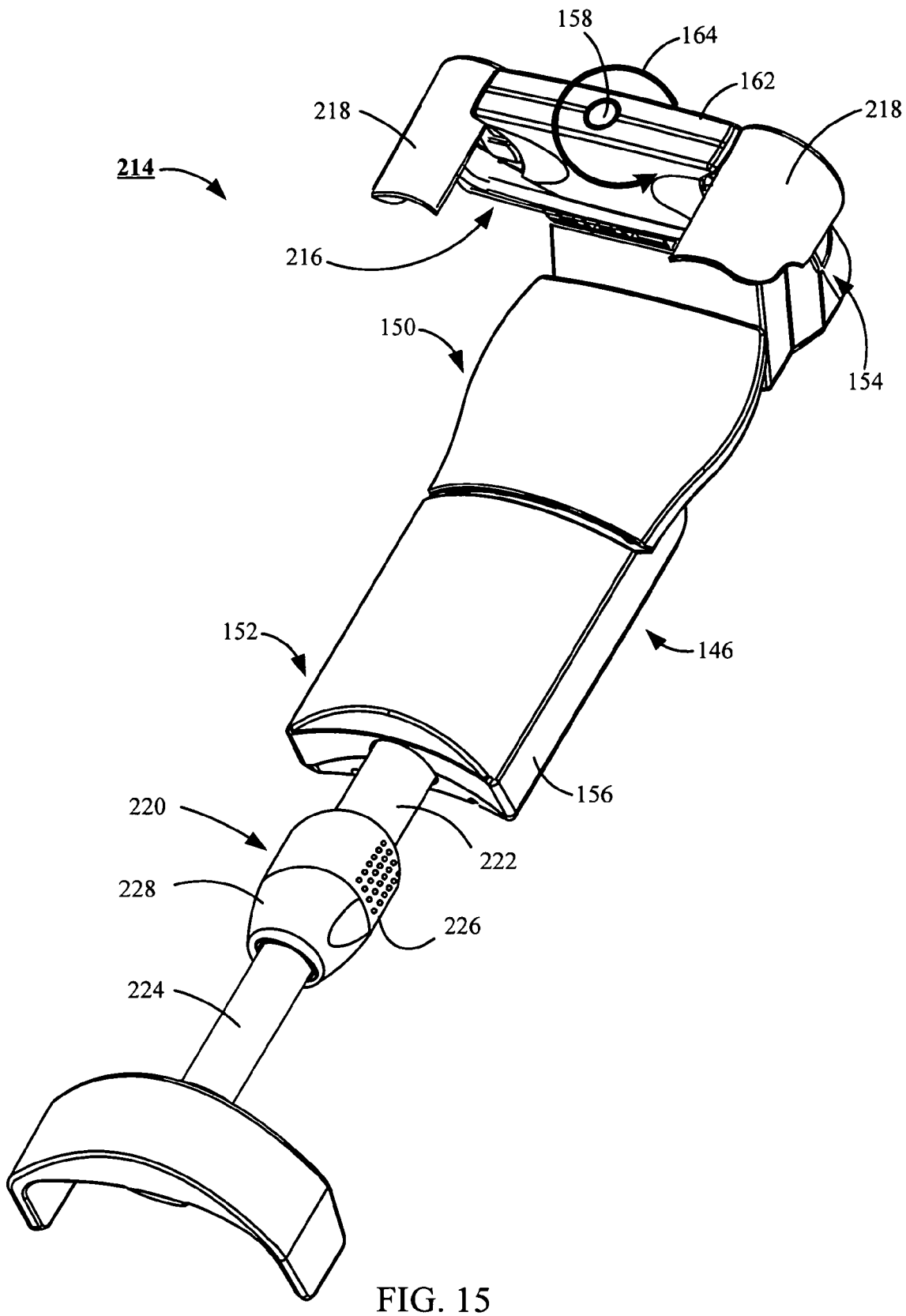
FIG. 15 is a top perspective view of an alternate preferred embodiment of an accessories support member.

FIG. 15 illustrates an alternate preferred embodiment of an accessories support member 214. The accessories support member 214 includes an accessories retention portion 216 (also referred to herein as a ski pole retention portion 216) adjacent the central support shaft 158, and features a hanging support portion 218, which aids in the retention of the accessories support member 214 when hung on a ski rack. The accessories support member 214 further includes an expansion collet 220 that joins a positioning member 222, in sliding contact with the first attachment member 146, with an extension member 224. By loosening an adjustment member 226 of the collet 220 relative to the retention jaw member 228, the extension member 224 can be slid axially relative to the positioning member 222.

Figure 16:
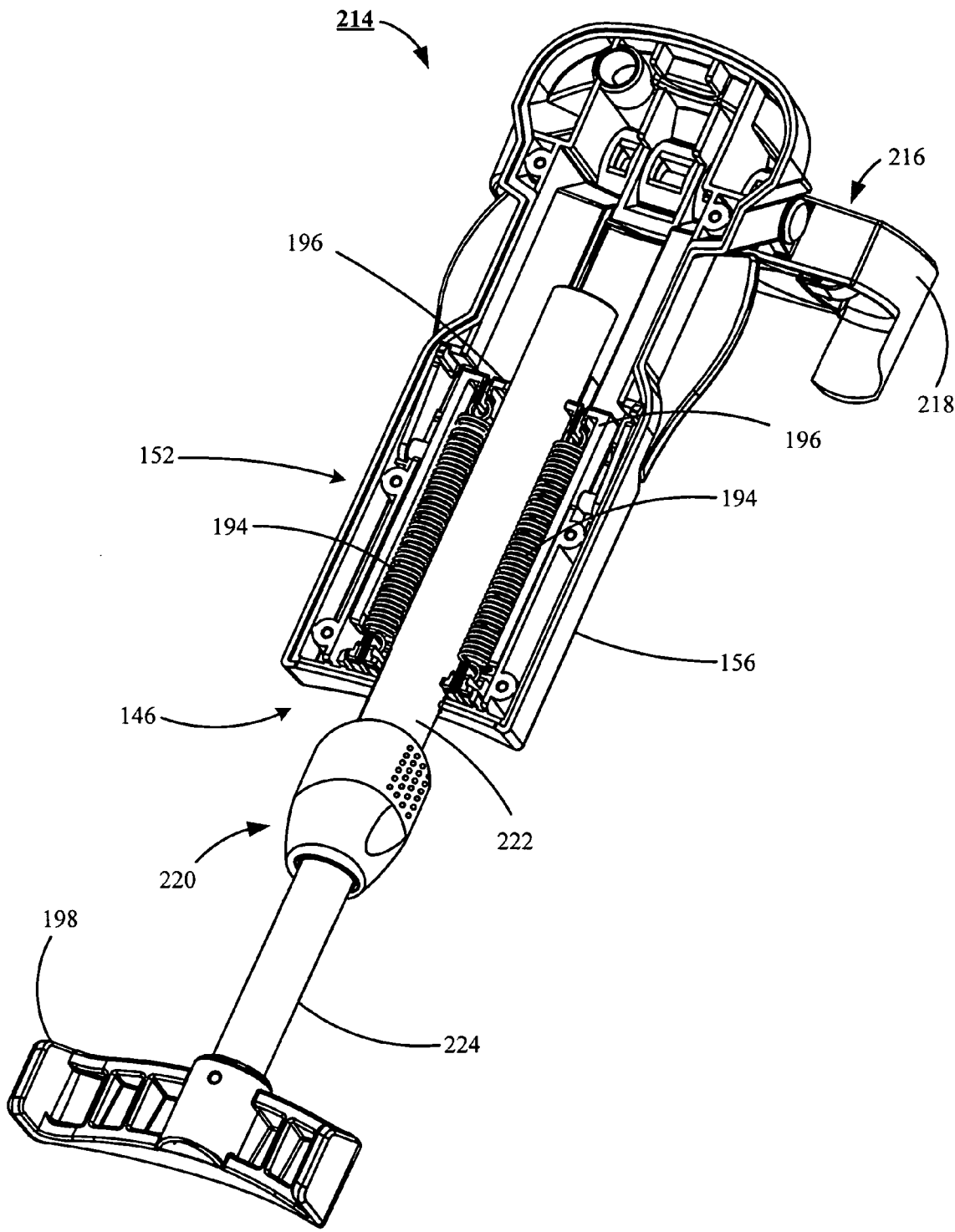
FIG. 16 is a bottom perspective view of the alternate preferred embodiment of the accessories support member of FIG. 15.
Figure 17:
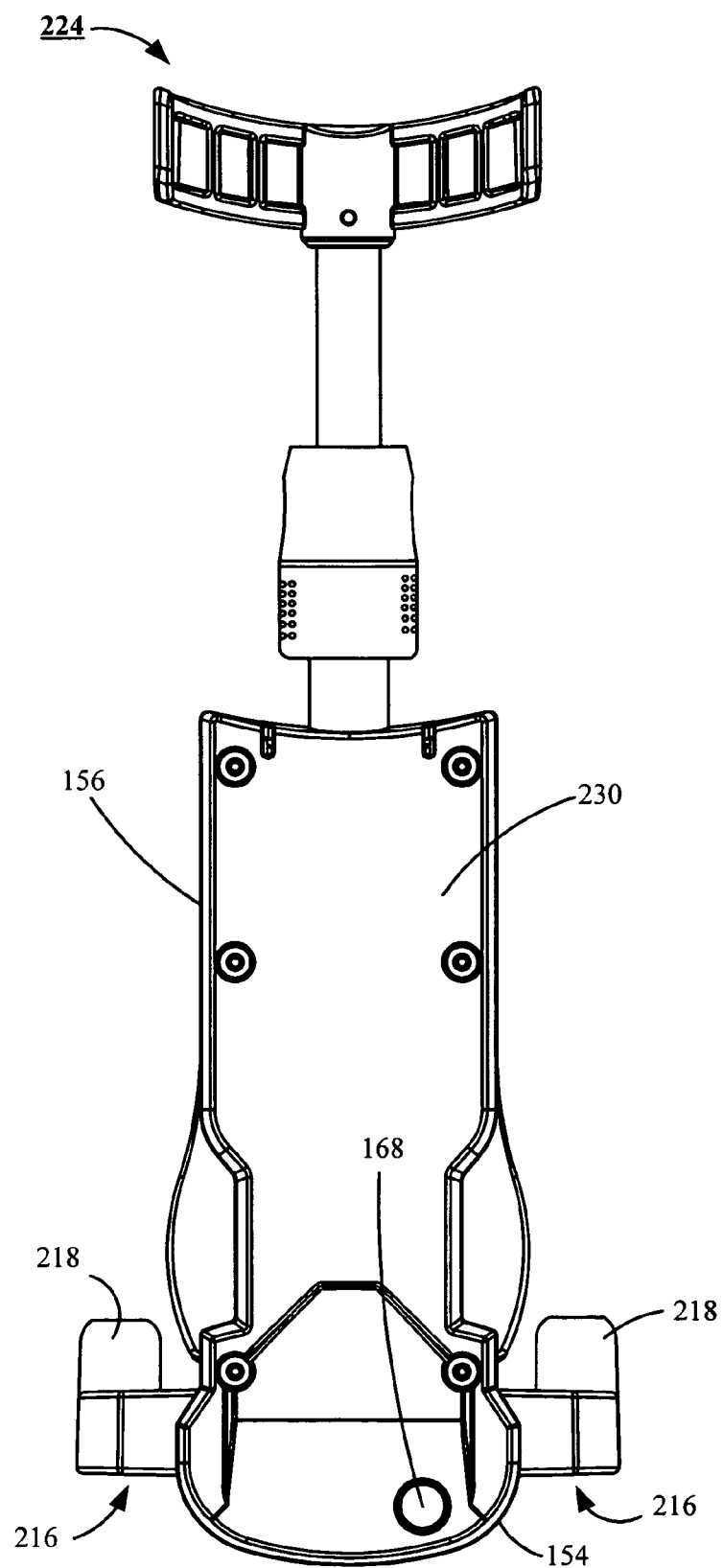
FIG. 17 is a bottom plan view of the alternate preferred embodiment of the accessories support member of FIG. 15.

FIG. 16 shows the positioning member 222 communicates with the pair of tension springs 194 that interact between the main body portion 156 and a pair of spring tabs 196 to adjust the overall size of the accessories support member 214 to precisely fit a particular sizing of the binding 118 (of FIG. 5). While FIG. 17 shows a base 230 upon which the main body portion 156 and a front confinement portion 154 are secured, and a cable lock access aperture 168 for use in securing the accessories support member 214 to a stationary object when not in use.

Figure 18:
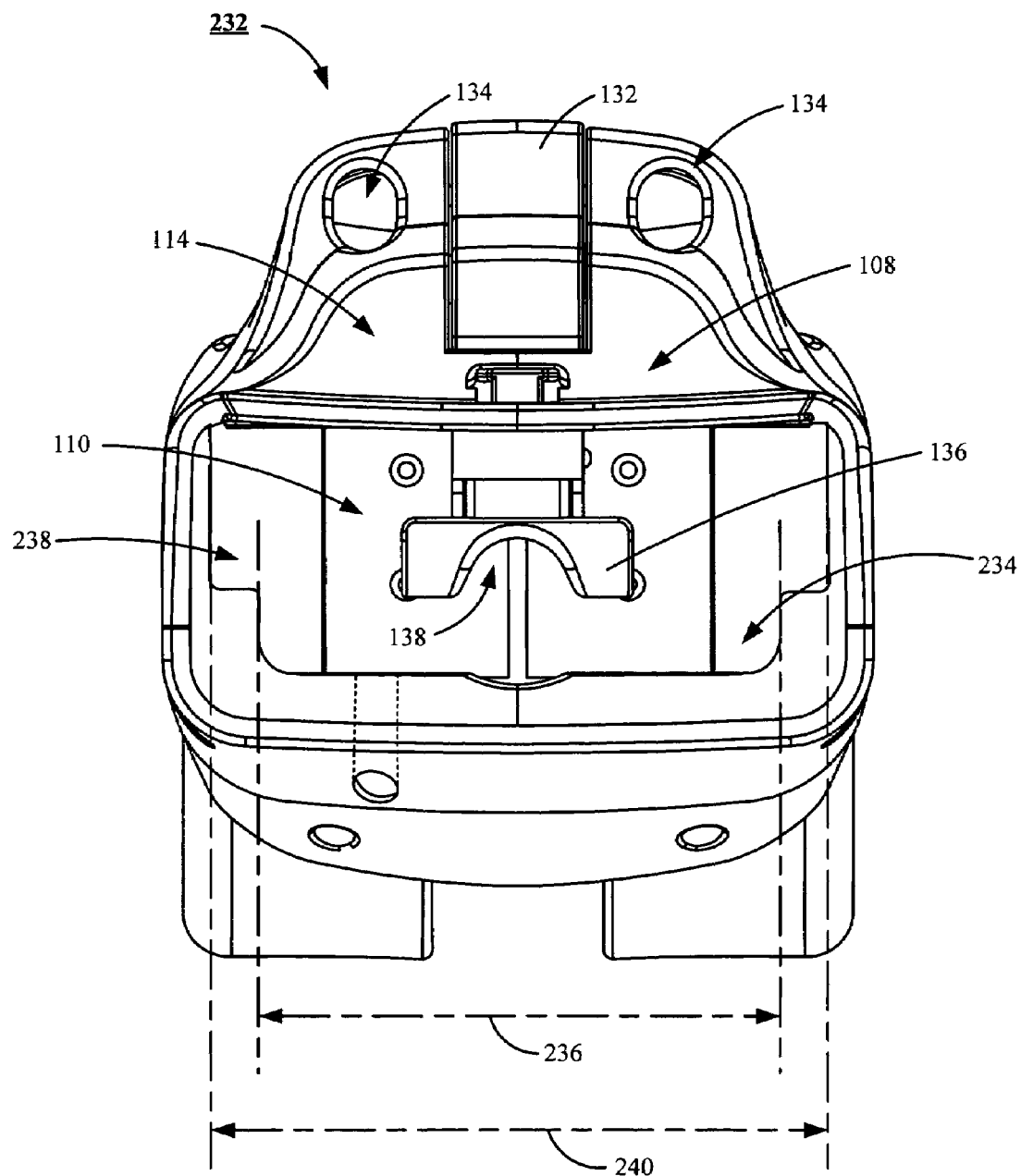
FIG. 18 is a top plan view of an alternate preferred embodiment of a novel sports equipment transport apparatus of FIG. 1.

FIG. 18 shows that an alternate preferred embodiment transport caddy 232 provides a pair of ski pole tip apertures 134 and a plunger 136 of the spring loaded mechanical latch 108. The plunger 136 provides a relief 138, which is configured to accommodate securement of the accessories support member 224 (of FIG. 15) within the primary confinement compartment 110, when the primary confinement compartment is not in use for transporting skis 112 (of FIG. 1). The ski pole tip apertures 134 provide access by a tip 140 (of FIG. 4) of each ski pole of the pair of ski poles 116 (of FIG. 4). In a preferred embodiment, the transport caddy 232 provides a first ski access aperture 234 configured to accommodate skis equal to and less than width 236, and a second ski access aperture 238 configured to accommodate skis having a width greater than width 236, and less than or equal to width 240. The transport caddy 232 is preferably formed from a polymer such as ABS, and the plunger is formed from a polymer such as Delron®, or Nylon®.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims. One such change contemplated by the present invention, is a mounting of the pair of wheels in an orientation rotated 90 degrees from the orientation of the pair of wheels depicted in FIG. 1. An orientation of the pair of wheels 90 degrees from the orientation of the pair of wheels as depicted in FIG. 1, would present to the skier an edge of the pair of skis rather than a face of the pair of skis.

What is claimed is:

1. An apparatus comprising:
    a wheel supporting a transport caddy;
    a spring loaded mechanical latch secured to said transport caddy; and
    an accessories support member disposed within said transport caddy and detachably secured to said transport caddy by said spring loaded mechanical latch, in which said accessories support member comprises:
        a base plate;
        a first attachment member secured to said base plate;
        an accessories confinement assembly secured to said first attachment member;
        a lockdown assembly adjacent said accessories confinement assembly and secured to said first attachment member; and
        a sizing assembly adjacent said lockdown assembly and secured to said first attachment member, wherein said spring loaded mechanical latch interacts with said sizing assembly to secure said accessories support member within said transport caddy.

2. The apparatus of claim 1, in which said transport caddy comprises:
    a primary confinement compartment supported by said wheel, wherein said accessories support member is disposed within said primary confinement compartment; and
    a secondary confinement compartment adjacent said primary confinement compartment, wherein said secondary confinement compartment is configured to accommodate said spring loaded mechanical latch.

3. The apparatus of claim 2, in which said transport caddy further comprises a second wheel and a brake assembly interposed between said wheel and said second wheel.

4. The apparatus of claim 1, in which said transport caddy includes at least a primary and secondary confinement compartment, said secondary confinement compartment providing an internal contour, and in which said spring loaded mechanical latch comprises:
    a shaft confined within said transport caddy;
    a plunger communicating with said shaft;
    a compressive spring confined within the shaft and communicating with said plunger; and
    a mechanical lever in pressing contact with said internal contour of said secondary confinement compartment, communicating with and acting on said spring when said mechanical lever is in a closed position, wherein said spring develops a compressive force in response to securement of said mechanical lever in said closed position, and further wherein said spring transfers said compressive force to said plunger to secure said accessories support member within said transport caddy in response to securement of said mechanical lever in said closed position.

5. The apparatus of claim 4, in which said accessories support member comprises a sizing assembly.

6. The apparatus of claim 1, in which said accessories confinement assembly comprises:
    a central support shaft attached to said first attachment member;
    an accessories retention portion positioned adjacent said central support shaft and secured to said first attachment member; and
    an accessories confinement member adjacent said accessories retention portion and retained by said central support shaft for rotation about said central support shaft.

7. The apparatus of claim 1, in which said lockdown assembly comprises a hinge portion attached to said first attachment member, a cover portion communicating with said hinge portion, and a retention feature provided by said cover portion and configured for interaction with said sizing assembly to maintain said sizing assembly in a predetermined fixed position relative to said first attachment member.

8. The apparatus of claim 1, in which said sizing assembly comprises:
    a positioning member in sliding contact with said first attachment member;
    an extension member in sliding contact with said positioning member;
    a second attachment member secured to said extension member; and
    a retention portion provided by said positioning member and configured for interaction with said lockdown assembly to maintain said second attachment member in a predetermined fixed position relative to said first attachment member.

9. An apparatus comprising:
    a wheel supporting a transport caddy;
    a spring loaded mechanical latch secured to the said transport caddy;
    a spring suspension removably disposed within said transport caddy and detachably secured to said transport caddy by said spring loaded mechanical latch;
    an accessories support member attached to said spring suspension; and
    a tow handle removably disposed within said transport caddy and detachably secured adjacent said spring suspension by said accessories support member, in which said accessories support member comprises:
        a base plate;
        a first attachment member secured to said base plate;
        an accessories confinement assembly secured to said first attachment member;
        a lockdown assembly adjacent said accessories confinement assembly and secured to said first attachment member; and
        a sizing assembly adjacent said lockdown assembly and secured to said first attachment member, wherein said spring loaded mechanical latch interacts with said sizing assembly to secure said accessories support member within said transport caddy.

10. The apparatus of claim 9, in which said spring suspension is an alpine snow ski, said tow handle is an alpine ski pole, and said transport caddy comprises:

a wheel supporting a primary confinement compartment wherein said alpine snow ski is removably disposed within said primary confinement compartment; and a secondary confinement compartment adjacent said primary confinement compartment, wherein said alpine ski pole is removably disposed within said secondary confinement compartment.

11. The apparatus of claim 10, in which said secondary confinement compartment providing an internal contour, and in which said spring loaded mechanical latch comprises:

a shaft supported by said transport caddy;

a plunger secured to said shaft;

a compressive spring enclosed by said shaft and communicating with said plunger; and a mechanical lever in pressing contact with said internal contour of said secondary confinement compartment, communicating with said shaft, and acting on said spring when said mechanical lever is in a closed position, wherein said spring develops a compressive force in response to said mechanical lever in said closed position, and further wherein said spring transfers said compressive force to said plunger to secure said alpine snow ski within said primary confinement compartment in response to said mechanical lever in said closed position.

12. The apparatus of claim 11, in which said alpine snow ski provides a ski boot binding, and in which accessories confinement assembly is a ski pole confinement assembly secured to said first attachment member, the lockdown assembly adjacent said ski pole confinement assembly and secured to said first attachment member, and wherein said lockdown assembly interacts with said sizing assembly to secure said first attachment member within said ski boot binding.

13. The apparatus of claim 12, in which said transport caddy further comprises a second wheel and a brake assembly interposed between said wheel and said second wheel, and in which said plunger is relieved to accommodate said sizing assembly.

14. The apparatus of claim 13, in which said ski pole confinement assembly comprises:

a central support shaft attached to said first attachment member;

a ski pole retention portion positioned adjacent said central support shaft and secured to said first attachment member; and a ski pole confinement member adjacent said ski pole retention portion and retained by said central support shaft for rotation about said central support shaft.

15. The apparatus of claim 14, in which said lockdown assembly comprises a hinge portion attached to said first attachment member, a cover portion communicating with said hinge portion, and a retention portion provided by said cover portion and configured for interaction with said sizing assembly to maintain said sizing assembly in a predetermined fixed position relative to said first attachment member.

16. The apparatus of claim 15, in which said sizing assembly comprises:

a positioning member in sliding contact with said first attachment member;

an extension member in sliding contact with said positioning member;

a second attachment member secured to said extension member; and a retention portion provided by said positioning member and configured for interaction with said lockdown assembly to maintain said second attachment member in a predetermined fixed position relative to said first attachment member and in a locking engagement with said ski boot binding.

17. A combination comprising:

a wheel supporting a transport caddy;

a spring loaded mechanical latch secured to the said transport caddy;

an alpine snow ski removably disposed within said transport caddy and detachably secured to said transport caddy by said spring loaded mechanical latch;

an accessories support member detachably attached to said alpine snow ski; and a ski pole removably disposed within said transport caddy and detachably secured adjacent said alpine snow ski by said accessories support member, wherein said ski pole is secured to said accessories support member by steps for securing said ski pole to said accessories support member, in which said accessories support member comprises:

a base plate;

a first attachment member secured to said base plate;

an accessories confinement assembly secured to said first attachment member;

a lockdown assembly adjacent said accessories confinement assembly and secured to said first attachment member; and a sizing assembly adjacent said lockdown assembly and secured to said first attachment member, wherein said spring loaded mechanical latch interacts with said sizing assembly to secure said accessories support member within said transport caddy.

18. The combination of claim 17, in which said ski pole is secured to said accessories support member by steps comprising:

positioning said alpine snow ski within a primary confinement compartment of said transport caddy;

activating said spring loaded mechanical latch to secure said alpine snow ski within said primary confinement compartment;

placing said accessories support member adjacent a ski boot binding of said alpine snow ski;

attaching said accessories support member to said ski boot binding;

positioning a tip of said ski pole within a secondary confinement compartment of said transport caddy;

rotating a ski pole confinement member of said accessories support member into non-adjacency with a ski pole retention portion of said accessories support member;

sliding a shaft portion of said ski pole past a pole retention spring clip of said accessories support member and into contact with said pole retention portion; and re-rotating said ski pole confinement member into pressing contact with said shaft portion to securely confine said shaft portion within said pole confinement member.

* * * * *